(12) United States Patent
Chung et al.

(10) Patent No.: US 6,888,892 B2
(45) Date of Patent: May 3, 2005

(54) METHOD FOR PADDING MACROBLOCKS

(75) Inventors: Chris Yoochang Chung, Lynnwood, WA (US); Kerem Karadayi, Seattle, WA (US); Rohit Garg, Seattle, WA (US); Donglok Kim, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 666 days.

(21) Appl. No.: 10/015,329

(22) Filed: Dec. 10, 2001

(65) Prior Publication Data

US 2003/0118110 A1 Jun. 26, 2003

(51) Int. Cl.[7] .............................................. H04N 7/12
(52) U.S. Cl. .............................................. 375/240.24
(58) Field of Search ...................... 375/240.01, 240.18, 375/240.24, 240.26, 240.27; 382/194; H04N 7/12

(56) References Cited

PUBLICATIONS

Berekovic, Mladen et al., 1999. Instruction Set Extensions for MPEG-4 Video. *Journal of VLSI Signal Processing*, 23:27–49.

Chandreskhar, L. et al., 2000. Bi-directional data flow architecture for padding in MPEG-4. (Part of the IS&T/SPIE Conference on Media Processors 2000), *SPIE*, 3970:161–166.

Primary Examiner—Young Lee
(74) Attorney, Agent, or Firm—Ronald M. Anderson

(57) ABSTRACT

A method for efficiently padding a macroblock of a video object plane employs two new instructions. The instructions, PadToRight and PadToLeft, are applied in alternating sequence during a PadPass 1 operation and a PadPass 2 operation. The results of these two operations are then averaged to pad each transparent pixel in each row of a macroblock that includes at least one opaque pixel. A Shift_in register is used to temporarily store data to facilitate the operation implemented by these instructions. Once the transparent pixels in each row have been padded horizontally, pixels in rows having shape data equal to zero (indicating all pixels in the row are transparent) are padded in a pre-processing step, followed by an upward propagation step. The two instructions are preferably implemented using 2:1 multiplexers implemented with an arithmetic logic unit. The method is particularly useful in set-top boxes, games, and other video applications.

27 Claims, 7 Drawing Sheets

METHOD FOR PADDING MACROBLOCKS

FIELD OF THE INVENTION

The present invention is generally directed to a system and method for padding macroblocks outside of the shape of a video object, and more specifically, to an algorithm and new instructions for performing horizontal and vertical padding of macro blocks around a video object in Motion Picture Experts Group Version 4 (MPEG-4) video data.

BACKGROUND OF THE INVENTION

The MPEG standards define lossy type compression schemes that are adapted to handle a variety of audio/video formats. For example, MPEG-2 (i.e., Version 2) supports standard television signal, HDTV signals, and five-channel surround sound, providing a broadcast-quality image at 720×480 pixel resolution for use in DVD movies. MPEG-1 and MPEG-2 employ frame-based coding standards. In contrast, MPEG4, which is the latest video coding standard, supports object-based compression/decompression and incorporates natural video and synthetic graphics objects. It is capable of relatively high compression ratios and is becoming a powerful tool for a wide range of applications, including Internet browsing, set-top boxes, video games, video conferencing, and wireless networks. In contrast to the frame-based coding standards to which both MPEG-1 and MPEG-2 are limited, this new standard is also capable of handling arbitrary-shaped objects. To facilitate the compression of arbitrary-shaped video objects, several new coding schemes have been added to those of the previous video coding standards. However, these new coding schemes are computationally expensive and relatively difficult to implement in hardware due to their complexity. Any hardware solution adopted to support the new coding schemes must also be able to support other features used in the MPEG standard. Accordingly, it would be preferable to develop a software solution that can more readily be implemented without significant processing overhead. Such a programmable solution would be much better than a hardware solution because of its inherent flexibility, and the relatively short time required to complete its development.

SUMMARY OF THE INVENTION

In accord with the present invention, a method is defined for using a processing device to pad data in a macroblock of a video object plane. The macroblock includes both texture data and shape data. To improve the efficiency of this task, two instructions are implemented. A first instruction is provided for padding successive data elements of the texture data in a first direction within the macroblock, by selectively copying data from a preceding data element to a current data element of the macroblock in the first direction, as a function of the shape data corresponding to the current data element. Similarly, a second instruction is provided for padding successive data elements of the texture data in a second direction within the macroblock, opposite the first direction, by selectively copying data from a preceding data element to a current data element of the macroblock in the second direction, as a function of the shape data corresponding to the current data element. The data elements of the texture data are processed sequentially with the first instruction, followed by the second instruction, producing first padded texture data. The texture data is processed again with the first instruction, producing second padded texture data. Next, corresponding data elements of the first padded texture data and the second padded texture data are averaged, producing partially padded texture data. Finally, any data elements of the partially padded texture data that are not yet padded are processed in a third direction in the macroblock, to provide padding as a function of the partially padded texture data and of the shape data.

The third direction is orthogonal to the first and the second directions. In one embodiment, the step of padding the data elements of the partially padded texture data that are not yet padded comprises the step of determining for each successive set of data elements that extend in the first and the second directions within the partially padded texture data, whether all of the data elements in the set have been provided with a texture value. For each set of data elements in which none of the data elements have yet been provided with texture values, the following steps are carried out. If, in regard to the third direction, any such set of data elements is disposed between two other sets of data elements that include texture data or padded data in the partially padded texture data, then each data element of said set is padded with an average of the texture data from a corresponding data element of each of said two other sets. Otherwise, each data element of the set of data elements is padded with data from a corresponding data element in an adjacent set of data elements that includes texture data or padded data in the partially padded texture data.

The method further comprises the step of temporarily storing texture data from a data element after padding in either the first direction or the second direction, for use in padding in the other of the first direction and the second direction. In addition, in another embodiment, the step of padding any of the data elements of the partially padded texture data that are not yet padded comprises the step of transforming the partially padded texture data to produce transformed partially padded texture data in which the third direction is aligned with the first and second directions, as a result of the transformation. Then the same sequence of steps initially used is applied to the transformed partially padded texture data to complete the padding operation.

Preferably, the method provides for only processing sets of data elements in the texture data that require padding. To achieve this result, the method includes the step of performing a logical AND of the shape data, along one of the first and second directions, to detect a logical state of a set of data elements in the shape data extending along that direction; the logical state indicates whether a corresponding set of data elements in the texture data requires padding. In addition, a logical AND of the shape data is performed along the third direction, to detect a logical state of a set of data elements in the shape data extending along the third direction; the logical state indicates whether a corresponding set of data elements in the partially padded texture data require padding.

Preferably, the first and second directions extend along rows of the data elements in the texture data of the macroblock, and the third direction extends along columns of the data elements in the texture data. Although horizontal padding must be done first for macroblocks used in MPEG schemes, it should be understood that in other types of applications, the present invention is more generally applicable to processing data in a macroblock without regard to the initial direction in which the data are padded. Thus, if not used for MPEG, the texture data might first be padded vertically and then horizontally using instructions that provide for padding upward, and padding downward to achieve the vertical padding, and then padding horizontally using either of the embodiments noted above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
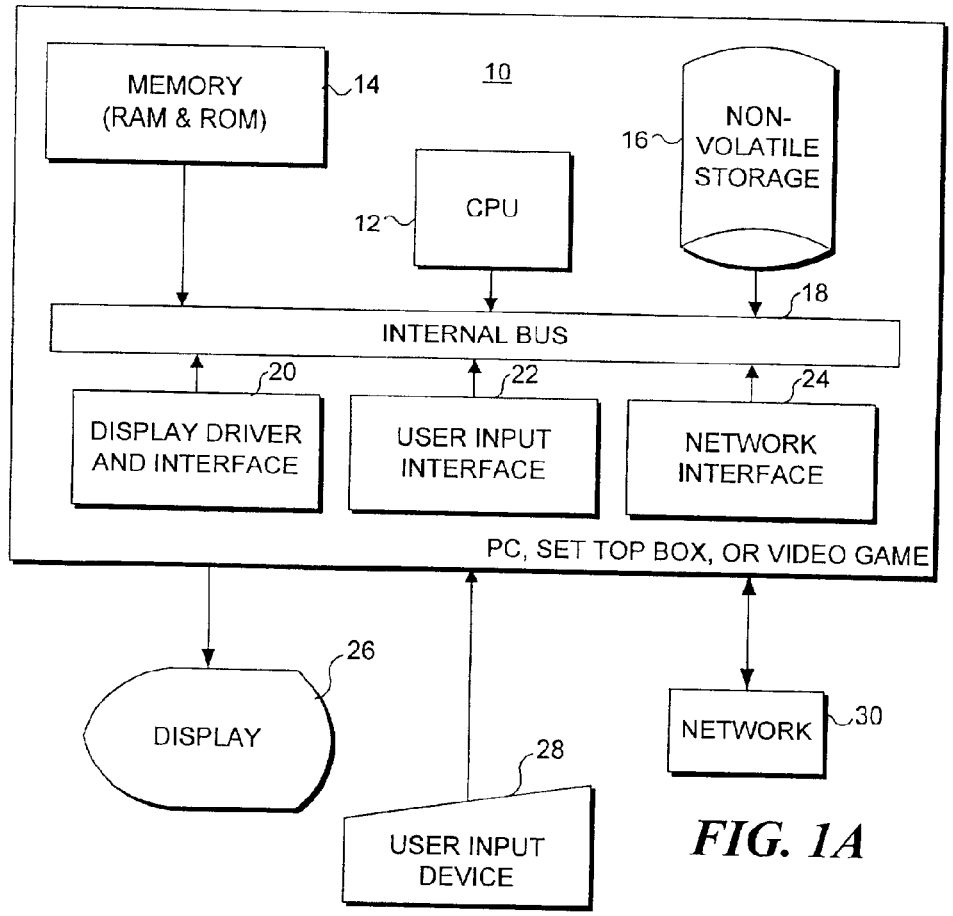
FIG. 1A is a functional block diagram of computing device, such as a conventional computer, set-top box, or video game, illustrating components suitable for implementing the present invention.

With reference to FIG. 1A, a block diagram of a computing device 10 that is suitable for implementing the present invention is illustrated. The computing device might comprise a conventional general purpose computer, a set-top box, a video game, or other type of video processing hardware that might need to pad macroblocks in a video data stream. While it is likely that many other functional components might be included in such a computing device, FIG. 1A illustrates certain basic components that will likely be included on many such devices. A central processing unit (CPU) 12 is included for carrying out processing of machine instructions that are stored in a memory 14 that includes both volatile random access memory (RAM) and non-volatile read only memory (ROM). Memory 14 is also used for storing data, including video data that are being processed in accord with the present invention. Optionally, a non-volatile storage 16, such as a hard drive or other magnetic or optical storage media, may be included to provide storage for machine instructions, for example, programs and modules or other executable code, and for storing data. An internal bus 18 is included for conveying data, machine instructions, and other types of signals between CPU 12, memory 14, and non-volatile storage 16. Internal bus 18 is also coupled to a display driver and interface 20, a user input interface 22, and optionally, to a network interface 24. Display driver and interface 20 is coupled to a display 26, which may comprise, for example, a monitor or a television. A user input device 28 is provided to enable a user to control the operation of the computing device, enter text and other input, manipulate a cursor or other graphical object, and carryout out other types of control and input functions. Examples of such a user input device include (without limitation) a keyboard, a mouse, a joystick, a wheel, a trackball, a touch pad, a game pad, etc. Computing device 10 may be coupled to a network 30, which may be a local network, another computing device, the Internet, a wide area network, or a server and may enable communication via either or both wire and wireless links (not shown).

Figure 1B:
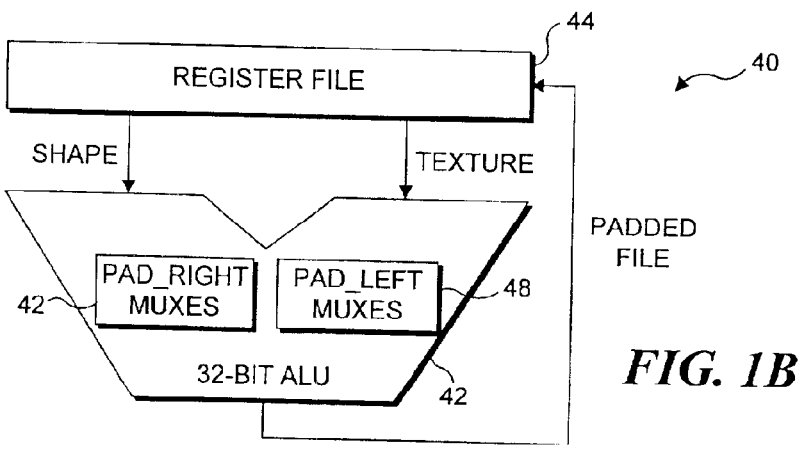
FIG. 1B is a schematic diagram of a 32-bit arithmetic logic unit (ALU) that implements Pad_Right and Pad_Left instructions using multiplexers (MUXs)

It is contemplated that computing device 10 will include video signal processing means 40, shown in FIG. 1B, which may be part of display driver and interface 20, or may be included in CPU 12. Video signal processing means 40 comprises a 32-bit (or larger) ALU 42 that is coupled to a register file 44, which may be stored in memory 14 or in non-volatile storage 16, or received via the network interface from network 30. The register file includes both shape and texture data that are input to the ALU. Included within the ALU are a plurality of PAD_RIGHT MUXs 46 and a plurality of PAD_LEFT MUXs 48 that carry out two new instructions used for padding macroblocks of video data objects, as described below. ALU 42 carries out the method described below, producing a padded file that is transferred back to register file 44 for further use, as will be well understood by those of ordinary skill in this art.

Figure 2:
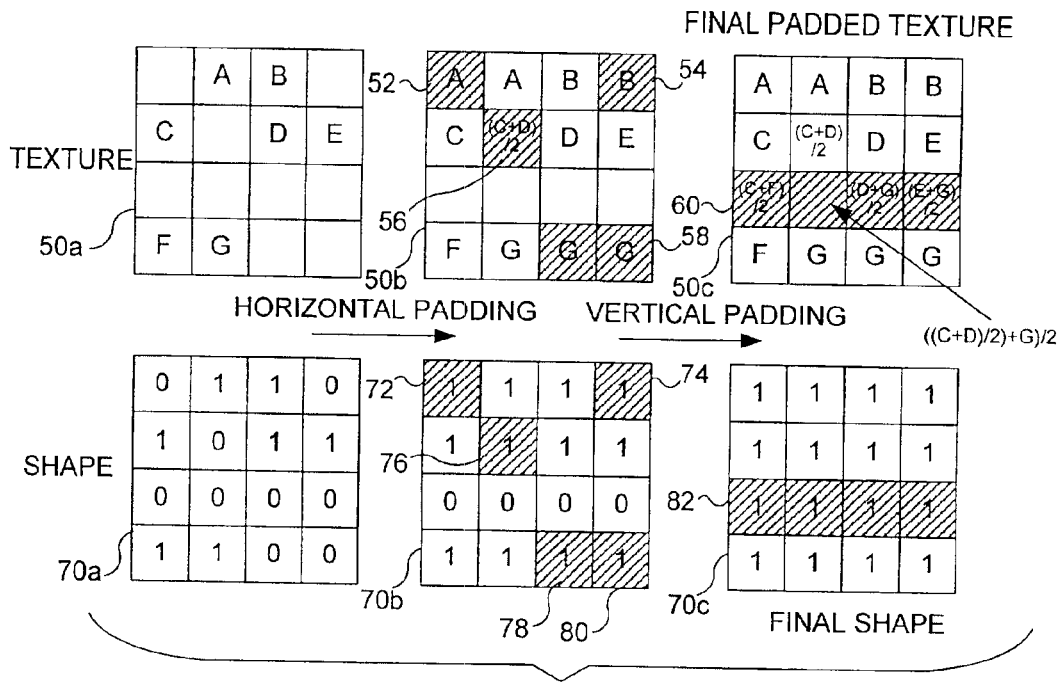
FIG. 2 is an example illustrating the horizontal and vertical padding of texture and shape data for a simple video object.

FIG. 2 shows a relatively simple example of boundary block padding of a 4×4 block, including texture data 50a and shape data 70a. Texture values A–G are associated with specific pixels in texture data 50a for the block. Each pixel having a shape value equal to a binary 0 in shape data 70a represents a transparent pixel, i.e., a pixel without any associated texture value. Padding is implemented in two steps, the first providing for horizontal padding, producing texture data 50b and shape data 70b, and the second providing vertical padding, which produces final padded texture data 50c and final shape data 70c. In the horizontal padding of the texture data, texture value A is copied into a pixel 52, texture value B is copied into a pixel 54, and texture value G is copied into pixels 58. Note that a pixel 56 between the opaque pixels that include values C and D in the second row becomes the average of C and D in texture data 50b, after the horizontal padding. The horizontal padding that produces shape data 70b results from copying a binary one into each empty pixel 72, 74, 76, 78, and 80, for each row of shape data 70a in which at least one pixel has a binary one in shape data 70a. Note that the shape data, s'[y][x], which is generated by horizontal padding, always consists of rows with either all zeros or all ones. Thus, the third row of shape data 70b is still empty after horizontal padding, since there is no opaque pixel in this row. During vertical padding, the third row of final texture data 50c is filled with the average pixel values 60 from the second and fourth rows, and the third row of final shape data 70c is filled with binary ones.

The padding process applied in FIG. 2 is defined by the following:

/* s[ ][ ] contains original shape data (i.e., shape data 50a), d[ ][ ] contains original texture data (i.e., texture data 70a), hor_pad[ ] is texture data 70b, resulting from horizontal padding, s'[ ][ ] is shape data 70b after horizontal padding, x' is the location of the nearest valid sample (s[y][x¹]==1) at the video object plane (VOP) boundary to the left of the current location x, x" is the location of the nearest boundary sample to the right, and N is the number of samples of a line in a macroblock. s'[ ][ ] is initialized to 0 and is used in the vertical padding process. */

```
for (x=0; x<N; x++) {
    if (s[y][x] == 1) { hor_pad[y][x] = d[y][x]; s'[y][x] = 1; }
    else {
        if ( s[y][x'] == 1 && s[y][x"] == 1) {
            hor_pad[y][x] = (d[y][x']+ d[y][x"])//2;
            s'[y][x] = 1;
        } else if ( s[y][x'] == 1 ) {
            hor_pad[y][x] = d[y][x']; s'[y][x] = 1;
        } else if ( s[y][x"] == 1 ) {
            hor_pad[y][x] = d[y][x"]; s'[y][x] = 1;
        }
    }
}
```

New Instructions and Algorithm for Padding

The pixel value used in padding a transparent pixel depends on whether the pixel is surrounded by opaque pixels in the same row. If a transparent pixel is between two opaque pixels in a row, the padded value applied to the transparent pixel will be the average of these two opaque pixels. Otherwise, the value applied to the transparent pixel will be copied from a boundary pixel, i.e., from the nontransparent pixel value in the row. In order to avoid this boundary condition check for every pixel and use partitioned operations (that are currently available in many processors), it is preferable to first generate two intermediate data results (one with texture data propagated to the left and another with the texture data propagated to the right) via two passes, i.e., PadPass1 and PadPass2, and then average them to generate the final padded texture, as shown in the simple example of FIG. 3.

Figure 3:
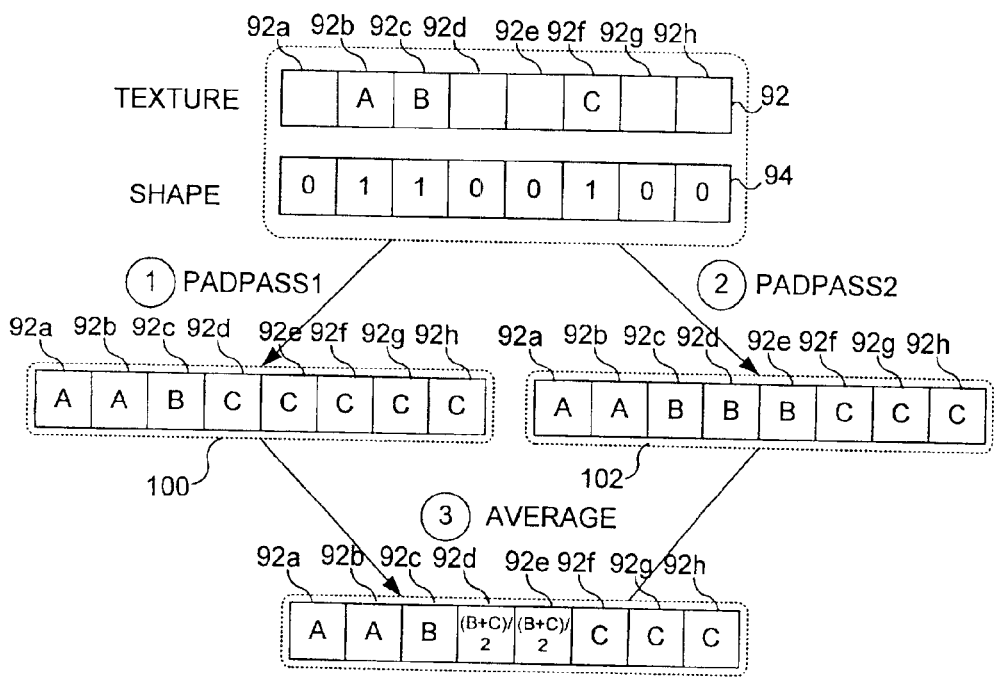
FIG. 3 illustrates the application of the Pad_Left and Pad_Right instructions of the present invention to exemplary texture data.

In FIG. 3, pixels 92a, 92d, 92e, 92g, and 92h are transparent, while pixel 92b includes a value A, pixel 92c includes a value B, and pixel 92f includes a value C. Shape data 94 include binary ones corresponding to each pixel that is opaque and binary zeroes for each transparent pixel. In PadPass1, pixel 92 is padded by padding any transparent pixel to the left with the value of the nearest opaque pixel to the right in the row. Thus, pixel 92a is padded with the value A from pixel 92b, and pixels 92e and 92f are padded with the value C from pixel 92f. Since there is no opaque pixel to the right of transparent pixels 92g and 92h, they are also padded with the value C from the nearest opaque pixel 92f. Next, in PadPass2, pixels 92d and 92e are padded to the right with the B value from pixel 92c, which is the nearest pixel to the left, and pixels 92g and 92h are padded to the right with the value C from pixel 92f, which is the nearest pixel to the left. Since pixel 92a has no opaque pixel to the left, it is padded with the value A from the nearest opaque pixel, which is pixel 92b. In the third step, the results of PadPass1 and PadPass2 are averaged.

Figure 4:
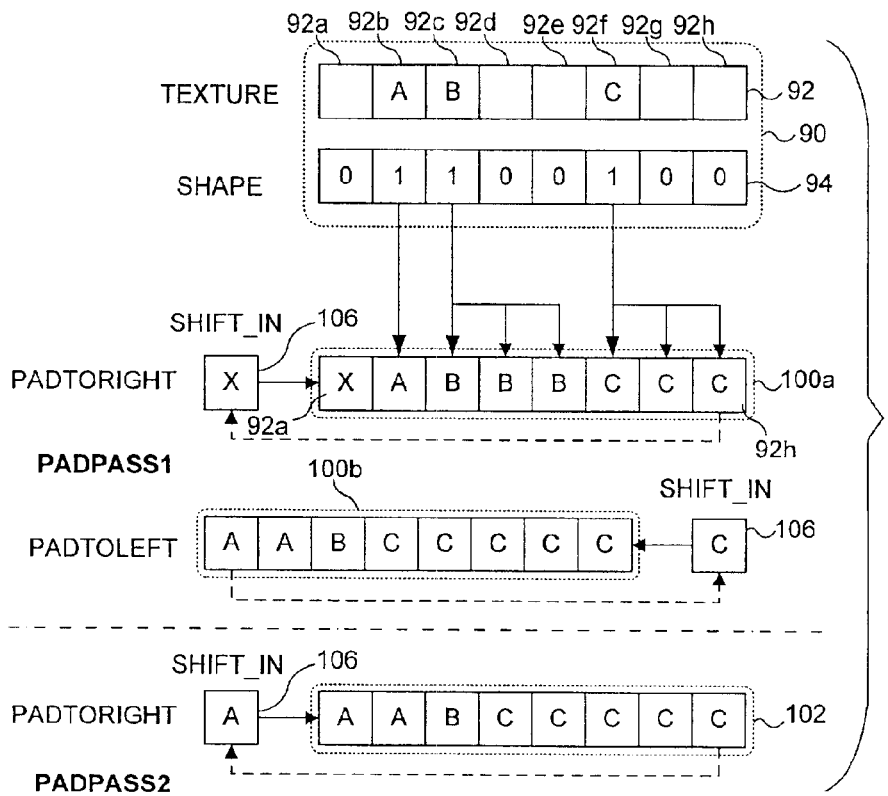
FIG. 4 is a schematic diagram illustrating further details for applying the instructions of FIG. 3 in two passes.

In order to generate the two intermediate data results from PadPass1 and PadPass2 more efficiently, two new instructions, Pad_Right (or PadToRight) and Pad_Left (or PadToLeft) are used in the present invention. FIG. 4 shows the implementation of PadPass1 and PadPass2 using these new instructions in connection with data for a VPO that includes a row of texture data 92 and a row of shape data 94. In this simple example, pixels 92a, 92d, 92e, 92g, and 92h are transparent, while pixel 92b includes a value A, pixel 92c includes a value B, and pixel 92f includes a value C. A special Shift_in register 106 is used to provide temporary storage of a shift-in value for use with the instructions. PadToRight propagates opaque pixels to the right and updates Shift_in with the rightmost byte of the result, value C from pixel 92h. Shift_in (before being updated) is used as a value X (i.e., a "don't care" value) that is shifted into pixel 92a, at the leftmost position of texture data 100a.

Similarly, PadToLeft propagates opaque pixels to the left and updates Shift_in with the leftmost byte from pixel 92a, the value A in resulting texture data 100b. Shift_in (before being updated) is used to provide the value C that shifted into the rightmost position. PadPass2 is then performed to produce texture data 102, using the second PadToRight instruction; the value A for leftmost boundary pixel 92a has already been found with the previous PadToLeft instruction and temporarily stored in Shift_in register 106.

The PadToRight instruction is implemented in accord with the following logic:

```
If (shape[0] == 0)
    dest[0] = Shift_In;
else
    dest[0] = texture[0];
for (i = 1; i < 8; i++ ) {
    if (shape[i] == 0 )
        dest[i] = dest[i-1];
    else
        dest[i] = texture[i];
}
```

Figure 5:
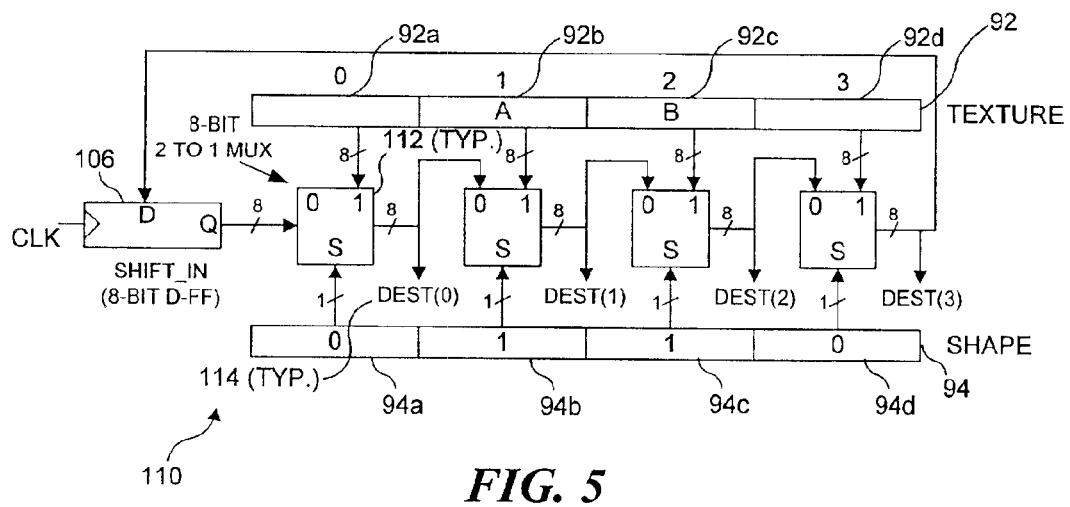
FIG. 5 is a schematic block diagram showing details of an 8-bit D flip-flop (used as a shift register) and four MUXs in a circuit applicable for implementing the Pad Right instruction of FIG. 3.
Figure 6:
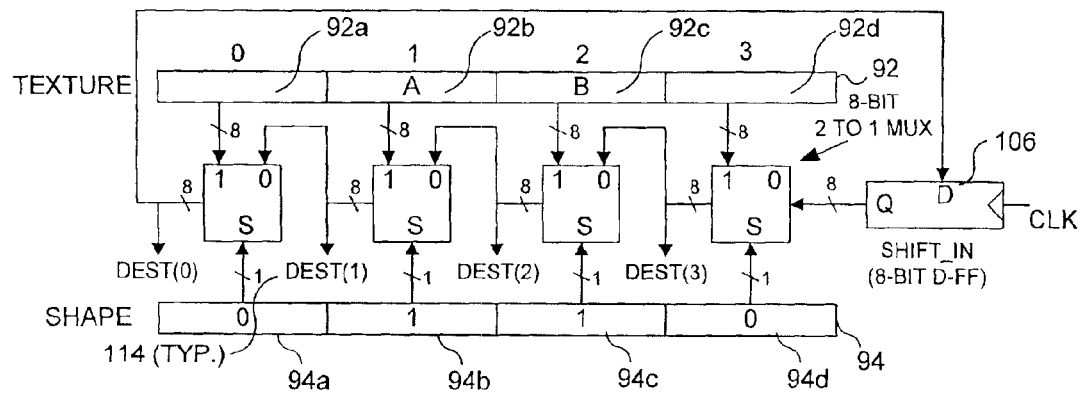
FIG. 6 is a schematic block diagram showing details of an 8-bit D flip-flop (used as a shift register) and four MUXs in a circuit for implementing the Pad_Left instruction of FIG. 3.

PadToRight and PadToLeft instructions can be implemented with a set of 2:1 MUXs). FIG. 5 shows an exemplary circuit to realize the PadToRight instruction in a 32-bit ALU that contains four 8-bit partitions. In this case, the longest path is the four consecutive 2:1 MUXs, which could have one cycle latency in most processor architectures. In the case of a 64-bit ALU, where the total MUX delay might be too large to fit in a single cycle, a pipeline stage can be inserted, and another set of PadToRight+PadToLeft instructions and a Shift_in register can be used for efficient software pipelining. The Shift_in register is not needed for padding 16×8 pixels in a 128-bit ALU. In FIG. 5, 8-bit texture data 92 and single-bit shape data 94 are input to terminals "1" and "S," respectively, of 2:1 MUXs 112. The output of each MUX 112 is directed to one of dest[0]–dest[3] (i.e., to one of destinations 114), and all but the output of the last MUX is also applied to the "0" terminal of the next MUX in the group. The output of the last MUX is applied to the "D" terminal of Shift_in register 106, which is an 8-bit D type flip-flop, with an 8-bit output coupled to the "0" terminal of the first MUX in the group. FIG. 6 illustrates how the PadToLeft instruction is implemented with a similar group of MUXs 112.

Figure 7:
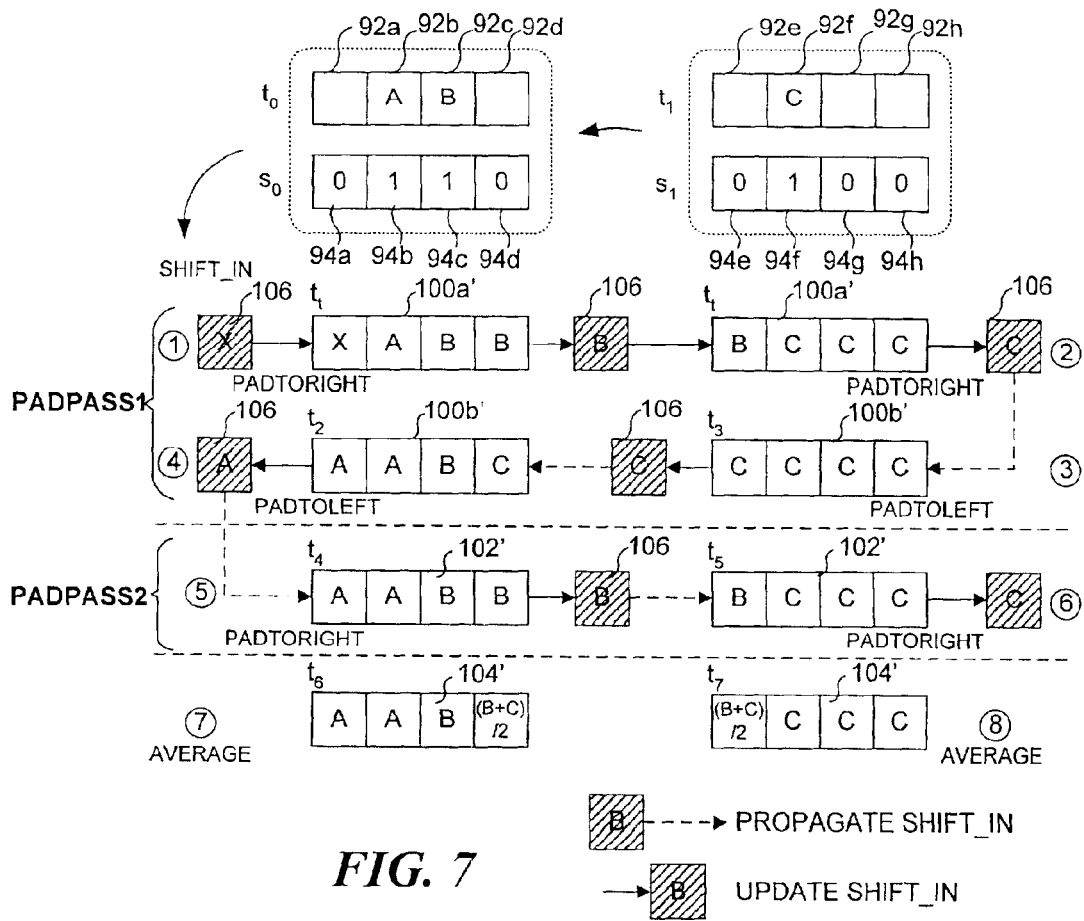
FIG. 7 is a schematic diagram showing further details of the algorithm for horizontal padding on a 32-bit ALU with four 8-bit partitions, in accord with the present invention.

Since padding is performed at the 16×16 macroblock level, each row in a macroblock can be divided into several segments depending on the ALU width. With a 32-bit ALU, for example, there are four (in the case of a luminance block) and two (in the case of a chrominance block) segments in a row. FIG. 7 shows how the new instructions handle eight texture data values (each one byte in size) for pixels 92a–92h, when executed with a 32-bit ALU. The shape data for each pixel are one-bit values 94a–94h. First, two PadToRight instructions (①  and ②) are issued to find the right boundary pixel of the shape in texture data 100a'. Shift_in registers 106 are used for temporarily storing texture values, at each end of the texture data in these and the following steps. Second, two PadToLeft instructions (③ and ④) are issued to propagate opaque pixels to the left with the boundary pixel found, producing texture data 100b'. Two PadToRight instructions (⑤ and ⑥) are again used to propagate opaque pixels to the right, producing texture data 102'. Finally, the two intermediate results, texture data 100b' and 102' are averaged. The average results, texture data 104', are rounded away from zero to the nearest integer as defined in the MPEG-4 standard.

Vertical Padding

The simplest method of vertical padding would be to transpose the horizontal padding results (using a conventional array transposition technique) and apply the same horizontal padding algorithm to the transposed block. Alternatively, padding can be applied directly to the columns of the block that has been padded horizontally. The second approach utilizes the fact that the intermediate shape (horizontally padded shape data) contains rows that are either all zeros or all ones, thus simplifying the vertical padding procedure and avoiding transpositions.

Figure 8:
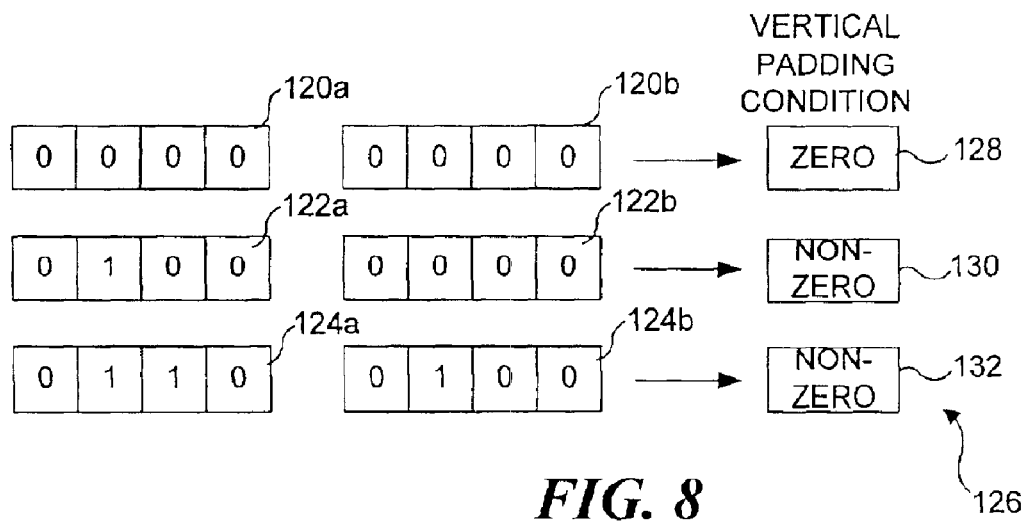
FIG. 8 is a schematic diagram providing an exemplary illustration of how the shape data are generated to determine a vertical padding condition.

A conditional move instruction (CondMove destination, source, control), which can be found in many processors, is preferably used to propagate the texture values of multiple opaque pixels vertically to fill-in transparent pixel texture values that remain after the horizontal padding process is complete. The conditional move instruction copies the source operand to the destination, only if the control value is nonzero. Note that only one column of shape data is needed because the shape data in a row become either all binary zeros or all binary ones after horizontal padding is completed. In this case, the control values of CondMove for a row can be generated by performing bit-wise OR operations on all the shape data in each row 120a and 120b, 122a and 122b, and 124a and 124b, as shown in FIG. 8, yield vertical padding condition results 126, as noted in blocks 128, 130, and 132, respectively. Vertical padding condition results 126 are then used to provide the condition of 'zero' or 'nonzero' for the intermediate shape employed in vertical padding.

Figure 9:
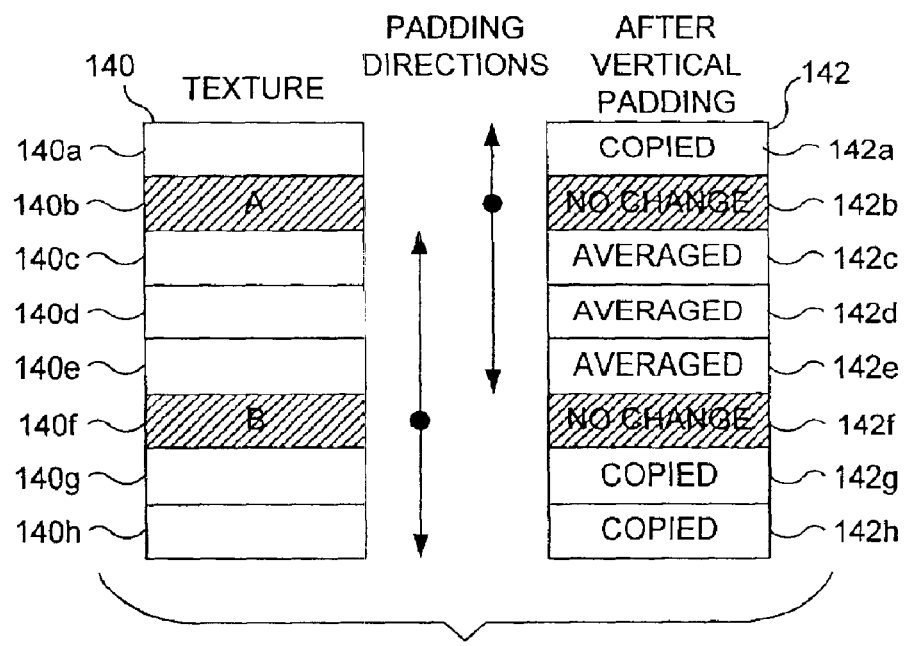
FIG. 9 is an exemplary schematic block diagram showing how the vertical padding condition is applied in determining vertical padding of texture data having two opaque rows.

FIG. 9 shows vertical padding directions for padding a column 140 of texture data. In these data, pixels 140a, 140c, 140d, 140e, 140g, and 140h are transparent and must be vertically padded relative to opaque pixels 140b and 140f. Each opaque row (i.e., any row with a nonzero intermediate shape condition) must be propagated to pad neighboring transparent rows in both upward and downward directions, and any transparent pixels between two opaque rows must be padded with the average of the texture value for its two boundary opaque rows. The result is indicated in the texture data of column 142. As shown in this figure, the texture value from pixel 140b is copied into pixel 142a, and the texture value form pixel 140g is copied into pixels 140g and 140h.

Figure 10:
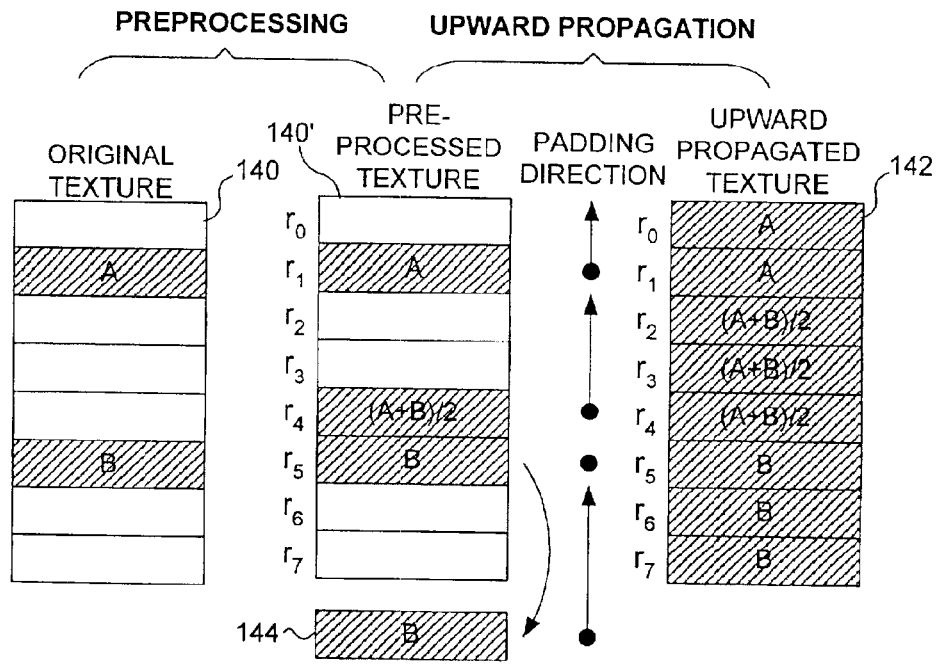
FIG. 10 is a schematic diagram illustrating texture data preprocessing and upward propagation of texture elements in a column.

A two-step vertical padding technique that includes the steps of preprocessing and upward propagation is shown in FIG. 10A last opaque row is found to determine the value of a bottom row 144. In the example shown, bottom row 144 has the texture value B. In addition, the shape and texture data are updated, so that the last row in each transparent region (e.g., r4 in preprocessed texture data 140') is padded with the average value of two surrounding opaque rows. Then, in the second step, the value of each pixel that is opaque in preprocessed texture data 140' is propagated upward using the conditional move instructions, producing upward propagated texture data 142.

The following code indicates how the shape and texture data are updated and how the bottom opaque row on a 4×8 block is determined:

```
For row 0
flag = 0;
if (s[i] !=0 {
    bottom = t[i];
    flag = 1;
}
For rows 1 to 7
if (s[i] != 0 ) {
    if (s[i-1] == 0 ) {
        t[i-1] = average ( t[i], bottom );
        s[i-1] = flag;
        flag = 1;
    }
    bottom = t[i];
}
/* Where current_t is t[i], current_s is s[i], prev_t is t[i-1], and prev_s is s[i-1].*/
```

Figure 11:
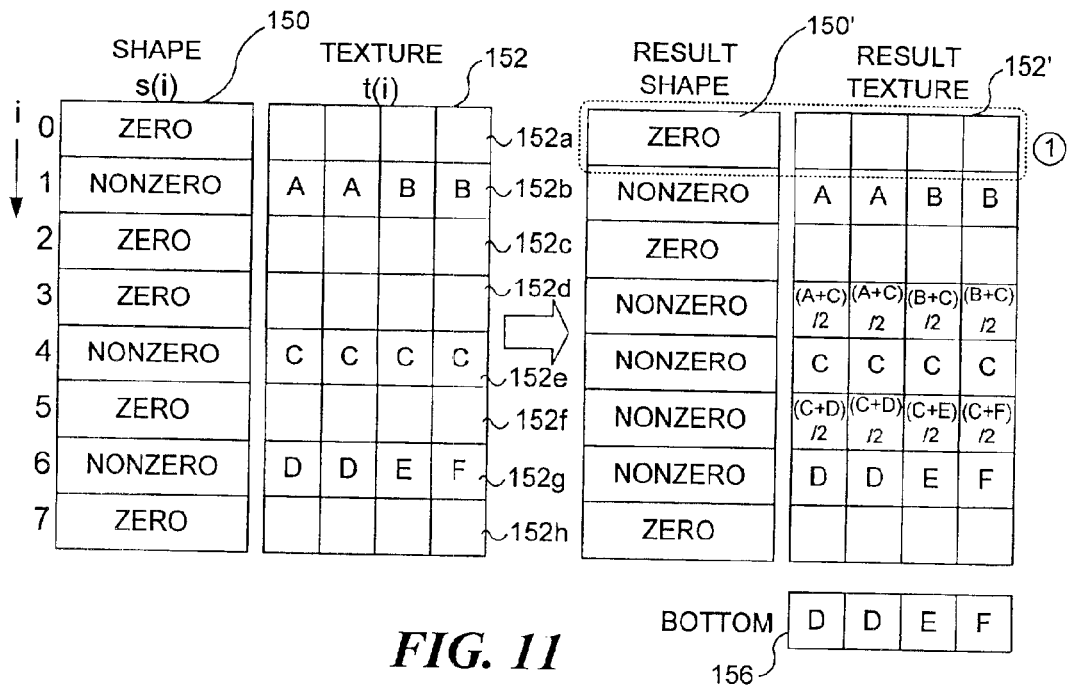
FIG. 11 is a schematic diagram illustrating the determination of a bottom row used in updating the texture data when vertically padding.

In FIG. 11, shape data 150, s[i], are scanned from top to bottom. Note that s[i] and t[i], s[i-1] and t[i-1] indicate the shape and texture of the current and previous rows, respectively of shape data 150 and texture data 152. First, the shape and texture for a row are updated if the row is the last row in each transparent region, then a bottom row 156 is updated if the row is nonzero. In other words, while scanning downward, if s[i-1] is zero and s[i] is nonzero, then t[i-1] becomes the average of t[i] and bottom and s[i-1] becomes nonzero; and, bottom is updated to t[i] if s[i] is nonzero. In fact, s[i-1] is set to flag in the code example shown to get around a problem that can result in the wrong shape and texture for the first transparent region identified, as shown in a result shape 150' and a result texture 152' in FIG. 11. This method is used intentionally to minimize the number of required instructions. The use of the flag variable solves this problem, since flag is initialized to 0 and becomes 1 once an opaque row is found, thus preventing the shape for the first transparent region from being updated to a nonzero value. Note that all other rows in each transparent region are updated in upward propagation as shown in FIG. 11.

The number of instructions used in this algorithm is shape dependent. For the first row, it takes four instructions if s[i] !=0, and two instructions otherwise. For other rows, there are three cases depending on whether the current and previous shapes are zero or nonzero.

Case 1 (s[i]==0): takes one branch instruction.
Case 2 (s[i] !=0 && s[i-1] ! 0): takes three instructions.
Case 3 (s[i] !=0 && s[i-1]==0): takes six instructions.

This method can be easily extended to the case where there are multiple words in a row. The following shows an example of the code for vertical padding on a 16×16 block, which consists of four 32-bit words in a row.

```
For row 0
flag = 0;
if ( s[i] ! = 0 ) {
    bottom[0] = t[i][0];
    bottom[1] = t[i][1];
```

-continued

```
        bottom[2] = t[i][2];
        bottom[3] = t[i][3];
        flag = 1;
}
For rows 1 to 15
if ( s[i] == 1 ) {
    if ( s[i-1] == 0 ) {
        t[i-1][0] = average ( t[i][0], bottom[0] );
        t[i-1][1] = average ( t[i][1], bottom[1] );
        t[i-1][2] = average ( t[i][2], bottom[2] );
        t[i-1][3] = average ( t[i][3], bottom[3] );
        s[i-1] = flag
        flag = 1
    }
    bottom[0] = t[i][0];
    bottom[1] = t[i][1];
    bottom[2] = t[i][2];
    bottom[3] = t[i][3];
}
/* Where current_t is t[i], current_s is s[i], prev_t is t[i-1], and prev_s
is s[i-1]. */
```

Performance Estimate

With the proposed instructions in this invention disclosure, horizontal padding for one segment requires four instructions, i.e., PadToRight, PadToLeft, PadToRight, and Average. For a 16×16 luminance block, 256 instructions (16 lines×4 segments/row×4 instructions/segment) are required with a 32-bit ALU. For an 8×8 chrominance block, 64 instructions (8 lines×2 segments/line×4 instructions/segment) are required. Since one macroblock consists of one 16×16 luminance block and two 8×8 chrominance blocks, a total of 384 instructions (256+64×2) are required to perform horizontal padding. In addition, 56 OR instructions (3 instructions/row×16 rows for the luminance shape and 1 instruction/row×8 rows for chrominance shape) are required to generate shape data for vertical padding.

Figure 12:
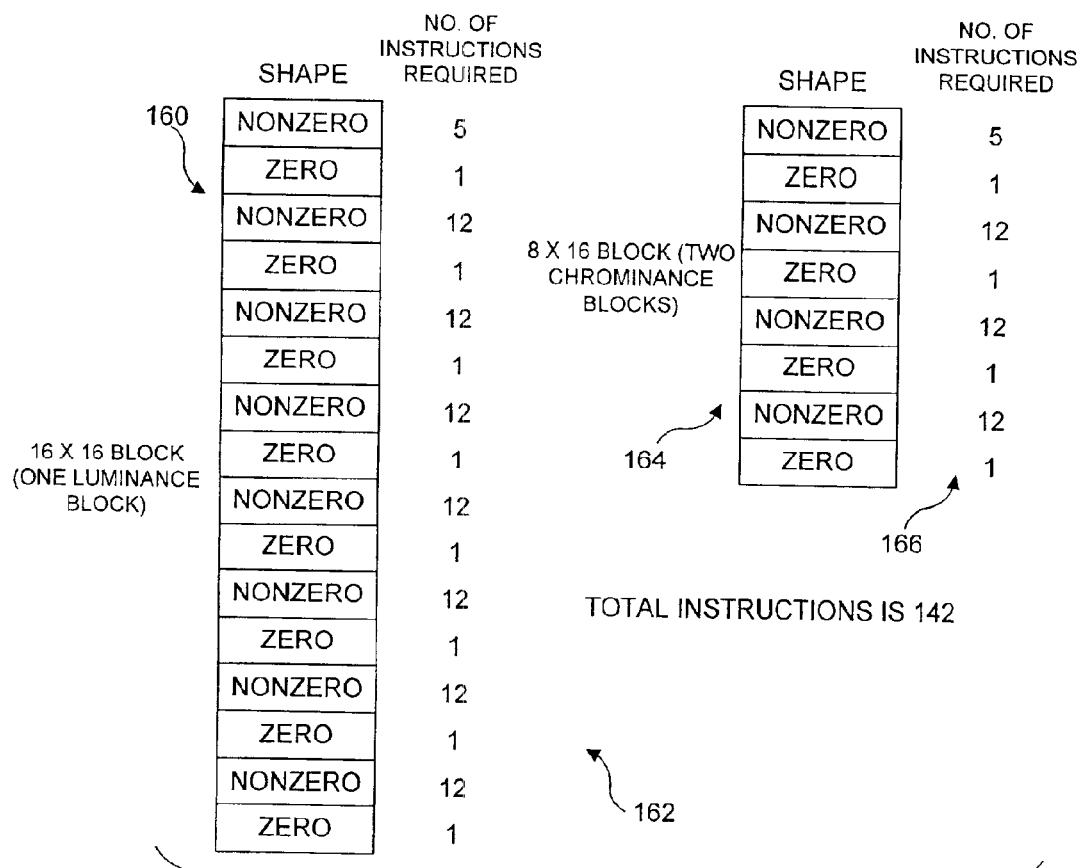
FIG. 12 is an exemplary table that lists the number of instructions required for preprocessing when padding in accord with the present invention.

The number of instructions required for preprocessing (updating the shape and texture) before upward propagation in vertical padding is shape dependent. Assuming worst case shape data 160 with binary values of 10101010 . . . , for the luminance block and corresponding values in shape data 164 for the chrominance block a total of 142 instructions are required as shown by adding the number of instructions tabulated in a column 162 and a column 166 in FIG. 12.

Upward propagation in vertical padding requires 8 instructions for an 8×4 block on a 32-bit ALU. Therefore, a total of 96 instructions (12 blocks×8 instructions/blocks) are needed to perform vertical padding on one macroblock, including the luminance and chrominance components.

It should be noted that a further reduction in the number of instructions required for padding can be made. First, more than 50% of macroblock rows are either all zeros or all ones. Each of these conditions can be detected by performing OR and AND operations on all the shape data in a row, respectively. Note that OR operations are already performed to generate shape data for vertical padding. In addition, 56 AND operations are required. Second, less than one half of the macroblocks actually require vertical padding, since many macroblocks are padded completely after only the horizontal padding operation is carried out. This condition in which vertical padding is not required can also be easily detected with an additional 15 AND operations. Note that it is only necessary to test the shape for luminance in this case, since the shape for chrominance is sub-sampled from the luminance shape.

The following code illustrates the steps for testing the shape data to further reduce the average number of instructions in actual bit streams. This method reduces the actual number of instructions that are required so that the number is significantly lower than the above worst case estimate. Also, since less than 4% of macroblock rows that require vertical padding need to be averaged, case 3 of the preprocessing step in the vertical padding rarely occurs, thus further reducing the actual processing time.

```
For ( rows ) {
    if ( ( ( OR al l shape data in the row) != 0 ) {
        if ( ( ( AND all shape data in the row ) != -1 )
            PerformHorizontalPadding ();
    }
}
if ( ( ( AND all vertical shape data ) != -1 ) {
    Pre-processing ();
    For ( columns ) {
        UpwardPropagation ();
    }
}
```

Although the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for using a processing device to pad data in a macroblock of a video object plane, said macroblock including both texture data and shape data, comprising the steps of:
    (a) providing a first instruction for padding successive data elements of the texture data in a first direction within the macroblock, by selectively copying data from a preceding data element to a current data element of the macroblock in the first direction, as a function of the shape data corresponding to the current data element;
    (b) providing a second instruction for padding successive data elements of the texture data in a second direction within the macroblock, opposite the first direction, by selectively copying data from a preceding data element to a current data element of the macroblock in the second direction as a function of the shape data corresponding to the current data element;
    (c) processing the data elements of the texture data with:
        (i) the first instruction;
        (ii) then with the second instruction, producing first padded texture data;
        (iii) then again with the first instruction, producing second padded texture data; and
        (iv) averaging corresponding data elements of the first padded texture data and the second padded texture data, producing partially padded texture data; and
    (d) padding any data elements of the partially padded texture data that are not yet padded, in a third direction in the macroblock, as a function of the partially padded texture data and of the shape data.

2. The method of claim 1, wherein the third direction is orthogonal to the first and the second directions, and wherein the step of padding the data elements of the partially padded texture data that are not yet padded comprises the steps of:
    (a) determining for each successive set of data elements that extend in the first and the second directions within the partially padded texture data, whether all of the data elements in the set have been provided with a texture value; and (b) for each set of data elements in which none of the data elements have yet been provided with texture values:

(i) if, in regard to the third direction, any such set of data elements is disposed between two other sets of data elements that include texture data or padded data in the partially padded texture data, then padding each data element of said set with an average of the texture data from a corresponding data element of each of said two other sets, and otherwise;

(ii) padding each data element of the set of data elements with data from a corresponding data element in an adjacent set of data elements that includes texture data or padded data in the partially padded texture data.

3. The method of claim 1, further comprising the step of temporarily storing texture data from a data element after padding in one of the first direction and the second direction, for use in padding in the other of the first direction and the second direction.

4. The method of claim 1, wherein the step of padding any of the data elements of the partially padded texture data that are not yet padded comprises the steps of:

(a) transforming the partially padded texture data to produce transformed partially padded texture data in which the third direction is aligned with the first and second directions, as a result of the transformation; and (b) repeating step (c) of claim (1) on the transformed partially padded texture data.

5. The method of claim 1, further comprising the step of only processing sets of data elements in the texture data in step (c) that require padding.

6. The method of claim 5, further comprising the step of performing a logical AND of the shape data, along one of the first and second directions, to detect a logical state of a set of data elements in the shape data extending along said one of the directions, said logical state indicating whether a corresponding set of data elements in the texture data require padding.

7. The method of claim 5, further comprising the step of performing a logical AND of the shape data, along the third direction, to detect a logical state of a set of data elements in the shape data extending along said third direction, said logical state indicating whether a corresponding set of data elements in the partially padded texture data require padding.

8. The method of claim 1, wherein the first and the second instructions each have a latency of only one processing clock cycle.

9. The method of claim 1, wherein the first and second directions extend along rows of the data elements in the texture data, and the third direction extends along columns of the data elements in the texture data.

10. A method for padding data of a macroblock in a video object plane, said macroblock including texture data and shape data, comprising the steps of:

(a) defining a first processor instruction that pads successive data elements of the texture data in a first direction along rows of the macroblock, by selectively copying data from a preceding data element in a row to a current data element in the row of the macroblock;

(b) defining a second processor instruction that pads successive data elements of the texture data in a second direction, opposite the first direction, along rows of the macroblock, by selectively copying data from a preceding data element in a row to a current data element in the row of the macroblock, along the second direction;

(c) applying the first and second processor instructions to the texture data in sequence, to pad data elements of each row of the texture data that do not include texture data, producing a partially padded macroblock;

(d) as a function of the shape data, determining each data element in the texture data of the partially padded macroblock that are yet to be padded; and (e) padding each data element determined in the preceding step to produce a fully padded macroblock, using data from data elements in a column of the partially padded macroblock in which the data element that is being padded is disposed.

11. The method of claim 10, wherein the step of padding each data element comprises the steps of:

(a) if the data element being padded is not disposed in the same column between two data elements that both include texture data, copying texture data from an adjacent data element in the same column into the data element being padded; and otherwise, (b) padding the data element that is disposed in the same column between the two data elements with an average of the data of said two data elements.

12. The method of claim 10, wherein the step of applying the first and second processor instructions to the texture data in sequence comprises the steps of:

(a) applying the first processor instruction to the texture data, producing texture data padded in the first direction;

(b) applying the second processor instruction to the texture data padded in the first direction, to produce first partially padded texture data;

(c) applying the first processor instruction to the first partially padded texture data, producing second partially padded texture data; and (d) averaging the first partially padded texture data and the second partially padded texture data, producing the partially padded texture data.

13. The method of claim 10, wherein the step of padding each data element comprises the steps of:

(a) applying a transformation to the partially padded texture data, producing transformed partially padded texture data in which columns of the partially padded texture data are transformed to rows of the transformed partially padded texture data;

(b) applying the first processor instruction to rows of the partially padded texture data, producing transformed partially padded texture data padded in the first direction;

(c) applying the second processor instruction to the rows of the transformed partially padded texture data that is padded in the first direction, to produce first transformed partially padded texture data;

(d) applying the first processor instruction to the rows of the first transformed partially padded texture data, producing second transformed partially padded texture data; and (e) averaging the first transformed partially padded texture data with the second transformed partially padded texture data to produce the fully padded texture data.

14. The method of claim 10, further comprising the step of temporarily storing data for a texture element disposed at an end of a row, as each of the first and second processor instructions are applied in sequence to rows of the texture data.

15. The method of claim 10, further comprising the steps of:
(a) identifying, as a function of the shape data, specific rows of the texture data in which data elements are disposed that must be padded using data from adjacent data elements in the same column; and
(b) only padding the data elements in the specific rows of the texture data identified in the preceding step.

16. The method of claim 15, wherein the step of identifying comprises the steps of:
(a) applying a logical OR function to successive rows of the shape data to produce a result for each row, said result indicating an empty row if the result for a row equals a binary zero; and
(b) only padding data elements of a row in which the result was not equal to a binary zero.

17. The method of claim 15, wherein the step of identifying comprises the steps of:
(a) applying a logical AND function to successive rows of the shape data to produce a result for each row, said result indicating a corresponding row of the texture data that is full of data if the result for the row of the shape data equals a binary one; and
(b) only padding texture data for a row in which the result for the corresponding row of the shape data was not equal to a binary one, since padding of a row of texture data is not required if all data elements of the shape data for the corresponding row are equal to a binary one.

18. The method of claim 10, wherein an arithmetic logic unit (ALU) employed to execute the first and second instructions to carryout steps (c)–(e), said ALU having a data capacity that is less than that of a row of the macroblock.

19. A system for padding data in a macroblock of a video object plane, said macroblock including texture data and shape data, comprising:
(a) a processing device coupled to receive a video data stream conveying the macroblock;
(b) a memory coupled to the processing device, said memory including machine instructions used for processing the macroblock when implemented by the processing device, said machine instructions including:
(i) a first processor instruction for padding successive data elements of the texture data in a first direction along rows of the macroblock, by selectively copying data from a preceding data element in a row to a current data element in the row of the macroblock, along the first direction; and
(ii) a second processor instruction for padding successive data elements of the texture data in a second direction, opposite the first direction, along rows of the macroblock, by selectively copying data from a preceding data element in a row to a current data element in the row of the macroblock, along the second direction; and
(c) said processing device responding to the machine instructions to apply the first instruction and second instruction in sequence to rows of the texture data, producing a first set of padded data and a second set of padded data, determining an average of corresponding data elements disposed in the first and second sets of padded data, producing partially padded texture data, and then padding columns of the partially padded texture data as a function of the shape data, to produce fully padded texture data.

20. The system of claim 19, wherein the machine instructions cause the processing device to determine if a data element in the partially padded texture data does not include data, and if so, pads the data element using data from at least one adjacent data element in a column in which the data element being padded is disposed.

21. The system of claim 20, wherein if the data element being padded is disposed between two data elements in the same column of the partially padded texture data and the two data elements both include data, the machine instructions cause the processing device to determine an average of the data for said two data elements to pad the data element being padded; and otherwise, the machine instructions cause the processing device to copy data from an adjacent data element in the same column as the data element being padded, for use in padding the data element being padded.

22. The system of claim 19, wherein the processing device comprises an arithmetic logic unit.

23. The system of claim 19, wherein the machine instructions further cause the processing device to temporarily store data from data elements at an end of the rows of the texture data, as the first and second instructions are sequentially applied to the rows.

24. The system of claim 19, wherein the machine instructions further cause the processing device to apply a logical OR function to the shape data, to determine a result for each row of the shape data, and based upon the result for the row, to determine whether a corresponding row of the partially padded texture data needs to be padded using the data from at least one adjacent data element of the partially padded texture data.

25. The system of claim 19, wherein the machine instructions further cause the processing device to apply a logical AND function to the shape data, to determine a result for each row of the shape data, and based upon the result for the row, to indicate whether a corresponding row of the texture data needs to be padded.

26. The system of claim 19, wherein the first and the second processor instructions each have a latency of only one clock cycle of the processing device.

27. The system of claim 19, wherein the processing device uses a multiplexer when implementing the first and second processor instructions.

* * * * *